Sept. 4, 1928.

H. A. SELAH

CONDUIT FITTING

Filed June 30, 1925

1,683,415

Inventor
Howard A. Selah
By
Attorney

Patented Sept. 4, 1928.

1,683,415

UNITED STATES PATENT OFFICE.

HOWARD A. SELAH, OF ERIE, PENNSYLVANIA, ASSIGNOR TO ERIE MALLEABLE IRON COMPANY, OF ERIE, PENNSYLVANIA, A CORPORATION OF PENNSYLVANIA.

CONDUIT FITTING.

Application filed June 30, 1925. Serial No. 40,541.

This invention is particularly designed to connect threadless conduits and as specifically shown is in the form of a coupling the only function of which is to form such connection. Features and details of the invention will appear from the specification and claims.

The invention is illustrated in the accompanying drawings as follows:—

Figure 1:
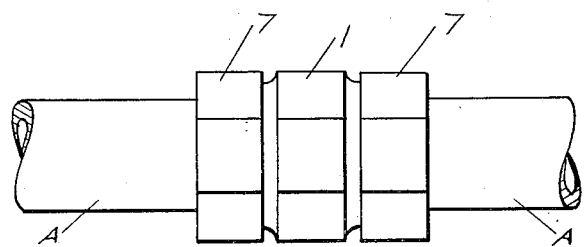

Fig. 1 shows a side elevation of the coupling.

Figure 2:
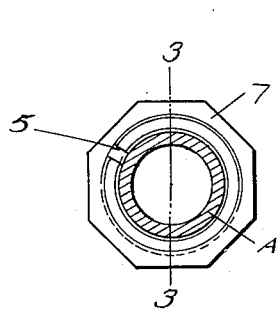

Fig. 2 an end elevation of the coupling.

Figure 3:
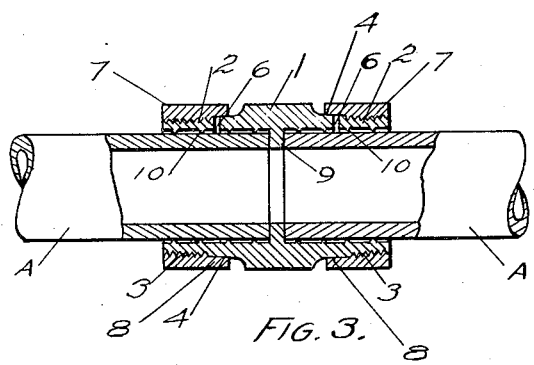

Fig. 3 a central section on the line 3—3 in Fig. 2.

Figure 4:
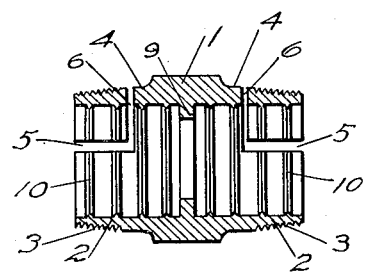

Fig. 4 a central section through the body of the coupling.

1 marks the body of the coupling. This has the oppositely projecting extensions 2, each extension being screw-threaded at 3 at its outer end and having a cylindrical surface 4 in continuation of the screw-threaded surface. An axial slot 5 extends inwardly from the end of the extension and terminates in a circumferential slot 6.

A nut 7 is screwed on the screw-threaded extension, the screw threads being tapered and the nut tapered so that the nut as it advances contracts the extension so as to engage an inserted conduit A. The nut has a cylindrical portion 8 at its inner end which is adapted to telescope the cylindrical surface 4 and thus cover and close the slot 6. A shoulder 9 is arranged midway of the coupling and this forms a guard and stop for the inserted conduits A. The extensions are provided with the cutting ribs 10 which are adapted to bite into and penetrate the enamel with which the conduit is usually protected so as to effect an electrical connection between the conduits.

What I claim as new is:—

1. In a conduit fitting, the combination of a body having a continuous annular wall and having oppositely projecting extensions, each having a screw-threaded end and an axial slot extending inwardly from the end into a circumferential slot; and a nut on each end having a tapered engagement with the extension and contracting the same as the nut is advanced thereon, said nut covering the slot.

2. A conduit fitting comprising a contractible sleeve adapted to receive a conduit and having one end exteriorly screw-threaded, said sleeve having a continuous annular wall, a circumferential slot adjacent to the annular wall and an axial slot extending from the circumferential slot through the screw-threaded end of the sleeve; and a nut on the screw-threaded end, said fitting comprising means adapted to contract the sleeve upon an inserted conduit.

3. A conduit fitting comprising a contractible sleeve adapted to receive a conduit and having one end exteriorly screw-threaded, said sleeve having a continuous annular wall, a circumferential slot adjacent to the annular wall and an axial slot extending from the circumferential slot through the screw-threaded end of the sleeve; and a nut on the screw-threaded end, said nut and screw having tapered relation.

4. In a conduit fitting, the combination of a body having a continuous annular wall and having a projecting extension with a screw-threaded end projecting from an unthreaded portion of the extension and an axial slot extending inwardly from the end into a circumferential slot; and a nut on said extension having a tapered engagement therewith and contracting the same as the nut is advanced, said nut having an internal unthreaded portion at its inner end telescoping the unthreaded portion of the extension.

5. In a conduit coupling, the combination of a body having oppositely projecting extensions, each having a screw-threaded end and an axial slot extending inwardly from the end into a circumferential slot, said body having an internal shoulder midway of the body forming a stop and guard for an inserted threadless conduit; and a nut on each end having a tapered engagement with the extension and contracting the same as the nut is advanced thereon.

In testimony whereof I have hereunto set my hand.

HOWARD A. SELAH.